(12) United States Patent
Suryanarayana et al.

(10) Patent No.: US 9,467,524 B2
(45) Date of Patent: *Oct. 11, 2016

(54) WEB CONTENT CUSTOMIZATION VIA ADAPTATION WEB SERVICES

(71) Applicant: AT&T Intellectual Property I, L.P., Atlanta, GA (US)

(72) Inventors: Lalitha Suryanarayana, San Diego, CA (US); Sreenivasa Rao Gorti, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,603

(22) Filed: Dec. 20, 2013

(65) Prior Publication Data

US 2014/0108517 A1    Apr. 17, 2014

Related U.S. Application Data

(63) Continuation of application No. 13/619,506, filed on Sep. 14, 2012, now Pat. No. 8,621,197, which is a continuation of application No. 12/490,791, filed on Jun. 24, 2009, now Pat. No. 8,327,127, which is a continuation of application No. 11/502,087, filed on Aug. 10, 2006, now Pat. No. 7,568,201, which is a continuation of application No. 10/125,069, filed on Apr. 17, 2002, now Pat. No. 7,114,160.

(51) Int. Cl.
| | |
|---|---|
| G06F 9/00 | (2006.01) |
| G06F 15/16 | (2006.01) |
| H04L 29/08 | (2006.01) |
| G06F 17/30 | (2006.01) |
| H04L 29/06 | (2006.01) |

(52) U.S. Cl.
CPC ..... *H04L 67/2823* (2013.01); *G06F 17/30905* (2013.01); *H04L 29/06* (2013.01); *H04L 67/04* (2013.01); *H04L 67/303* (2013.01); *H04L 67/02* (2013.01); *H04L 69/329* (2013.01)

(58) Field of Classification Search
CPC ...................................................... G06F 9/4411
USPC ........................................................ 713/100
See application file for complete search history.

(56) References Cited

U.S. PATENT DOCUMENTS

| | | |
|---|---|---|
| 5,781,189 A | 7/1998 | Holleran et al. |
| 5,991,735 A | 11/1999 | Gerace |

(Continued)

OTHER PUBLICATIONS

Lum et al., "A Context—Aware Decision Engine for Content Adaptation," Jul.-Sep. 2002, 9 pages, PERVASIVE Computing.

(Continued)

*Primary Examiner* — Suresh Suryawanshi
(74) *Attorney, Agent, or Firm* — Hanley, Flight & Zimmerman, LLC

(57) ABSTRACT

Web content customization via adaptation web services is disclosed. An example method for providing customized web content comprises accessing a request for web content residing on a web server, the request originating from a client device and the request including an indication of a characteristic of the client device, and transmitting to the client device the modified web content based on a customization requirement associated with the characteristic of the client device, the modified version of the web content obtained by requesting a second server to transform the web content into the modified web content.

20 Claims, 4 Drawing Sheets

(56) References Cited

U.S. PATENT DOCUMENTS

| | | |
|---|---|---|
| 6,076,109 A | 6/2000 | Kikinis |
| 6,085,220 A | 7/2000 | Courts et al. |
| 6,128,663 A | 10/2000 | Thomas |
| 6,167,441 A * | 12/2000 | Himmel .................. 709/217 |
| 6,243,761 B1 | 6/2001 | Mogul et al. |
| 6,247,048 B1 | 6/2001 | Greer et al. |
| 6,247,050 B1 | 6/2001 | Tso et al. |
| 6,336,137 B1 | 1/2002 | Lee et al. |
| 6,345,279 B1 | 2/2002 | Li et al. |
| 6,345,298 B1 | 2/2002 | Moriya |
| 6,353,849 B1 | 3/2002 | Linsk |
| 6,360,249 B1 | 3/2002 | Courts et al. |
| 6,360,273 B1 | 3/2002 | Beurket et al. |
| 6,412,008 B1 | 6/2002 | Fields et al. |
| 6,421,733 B1 | 7/2002 | Tso et al. |
| 6,434,563 B1 | 8/2002 | Pasquali et al. |
| 6,470,378 B1 | 10/2002 | Tracton et al. |
| 6,486,892 B1 | 11/2002 | Stern |
| 6,553,410 B2 | 4/2003 | Kikinis |
| 6,564,259 B1 | 5/2003 | Baber et al. |
| 6,742,043 B1 | 5/2004 | Moussa et al. |
| 6,760,916 B2 | 7/2004 | Holtz et al. |
| 6,772,396 B1 | 8/2004 | Cronin et al. |
| 6,832,241 B2 | 12/2004 | Tracton et al. |
| 6,892,226 B1 | 5/2005 | Tso et al. |
| 6,938,077 B2 | 8/2005 | Sanders |
| 6,959,318 B1 | 10/2005 | Tso |
| 7,114,160 B2 | 9/2006 | Suryanarayana et al. |
| 7,127,493 B1 * | 10/2006 | Gautier .................. 709/217 |
| 7,149,964 B1 | 12/2006 | Cottrille et al. |
| 7,519,720 B2 | 4/2009 | Fishman et al. |
| 7,526,572 B2 * | 4/2009 | Omar et al. .................. 709/246 |
| 7,568,201 B2 | 7/2009 | Suryanarayana et al. |
| 7,596,645 B1 | 9/2009 | Hillebrand |
| 7,917,390 B2 | 3/2011 | Feinberg |
| 8,121,891 B2 | 2/2012 | Handel et al. |
| 8,150,938 B1 | 4/2012 | Walsh et al. |
| 8,327,127 B2 | 12/2012 | Suryanarayana et al. |
| 8,621,197 B2 | 12/2013 | Suryanarayana et al. |
| 2001/0048728 A1 | 12/2001 | Peng |
| 2001/0048735 A1 | 12/2001 | O'Neal |
| 2002/0010803 A1 | 1/2002 | Oberstein et al. |
| 2002/0010867 A1 | 1/2002 | Schaefer et al. |
| 2002/0016801 A1 | 2/2002 | Reiley et al. |
| 2002/0021669 A1 | 2/2002 | Kunito et al. |
| 2002/0054090 A1 | 5/2002 | Silva et al. |
| 2002/0071480 A1 | 6/2002 | Marjelund et al. |
| 2002/0103935 A1 | 8/2002 | Fishman et al. |
| 2003/0225726 A1 | 12/2003 | Simpson et al. |
| 2004/0071133 A1 | 4/2004 | Yusko et al. |
| 2004/0170155 A1 * | 9/2004 | Omar et al. .................. 370/349 |
| 2004/0205561 A1 | 10/2004 | Gibbs et al. |
| 2005/0262220 A1 | 11/2005 | Ecklund et al. |
| 2006/0046686 A1 | 3/2006 | Hawkins et al. |
| 2006/0282767 A1 | 12/2006 | Suryanarayana et al. |

OTHER PUBLICATIONS

"Internet Content Adaptation Protocol (ICAP)." Network Appliance, Inc. Version 1.01. Jul. 30, 2001. 13 pages.

Butler, Mark H. "Current Technologies for Device Independence." HP Laboratories Bristol. Apr. 4, 2001. 28 pages.

"WAP Push Architectural Overview." Wireless Application Protocol Forum, Ltd. Version 03, Jul. 2001. 24 pages.

* cited by examiner

WEB CONTENT CUSTOMIZATION VIA ADAPTATION WEB SERVICES

RELATED APPLICATIONS

This patent arises from a continuation of U.S. patent application Ser. No. 13/619,506, (now U.S. Pat. No. 8,621,197) filed Sep. 14, 2012, which is a continuation of U.S. patent application Ser. No. 12/490,791 (now U.S. Pat. No. 8,327,127), filed Jun. 24, 2009, which is a continuation of U.S. patent application Ser. No. 11/502,087 (now U.S. Pat. No. 7,568,201), filed Aug. 10, 2006, which is a continuation of U.S. patent application Ser. No. 10/125,069 (now U.S. Pat. No. 7,114,160), filed Apr. 17, 2002. The entireties of U.S. patent application Ser. No. 13/619,506, U.S. patent application Ser. No. 12/490,791, U.S. patent application Ser. No. 11/502,087, and U.S. patent application Ser. No. 10/125,069 are hereby incorporated by reference.

TECHNICAL FIELD

The present invention relates generally to the Internet. Particularly, the present invention relates to specialized Web transformation services.

BACKGROUND

As the number of devices accessing the World Wide Web (referred to herein as "Web") proliferates, Web content and applications need to be tailored to suit the characteristics of each device. These devices can include personal digital assistants, wireless communication devices, desktop or laptop computers, or any combination of these items. Typically these devices include a user agent that is responsible for interfacing between the device user and the Internet.

Current Web implementations typically involve developing, updating, and maintaining a specialized set of variants of Web content and its associated presentations—one for each possible device type. The content provider typically must also develop and maintain suitable transformation processors that can transform generic content (e.g., device independent) from one form to another.

Existing and emerging Web technologies support these capabilities through client side, server side, or intermediary based architectures. The latter of these involve conveying, to the server or intermediate proxy, requirements regarding the capabilities of the rendering environment along with the Web request that was made by the user. The requirements are interpreted and the content appropriate to the requesting device is selected or generated.

The final presentation is affected by a number of factors. The ability of the content provider to understand and interpret the various device characteristics and be able to tailor the content suitably is one such factor. Additionally, the final presentation is affected by the user's level of trust by various content providers, transcoding proxies, or other stakeholders regarding the use of the capabilities requirements made along with the request. The extent of trust on the part of content providers regarding the potential manipulation/transformation by intermediate proxies that is likely to occur on the return path of the response also affects the final presentation.

There are several disadvantages to the above factors. For example even if the intermediate proxies were able to provide transcoding services, it may not always be possible for the user to obtain the most suitable transformation from a specific proxy along its path. Additionally, the user may not have control over who is receiving, storing, or interpreting any part of the user's request or response. Security mechanisms, such as encryption of the request and content, may impact performance. Without trust and relationships in place, privacy mechanisms such as P3P would be difficult to implement along a proxy chain that involves transcoding. There is a resulting need to be able to customize web content reliably while providing a secure path for the content.

DETAILED DESCRIPTION OF THE DRAWINGS

The system and method of the present invention provides Web content customization by a specialized or niche Web computer server. The content adaptation function and the adaptation determination function are implemented as Web Services that are invoked by the web application server.

The Web content customization/transformation method of the present invention may be referred to using different terms of art. For example, the transformation may be referred to in the art as transcoding, adaptation, customization, or repurposing. All of these processes are substantially similar and are encompassed by the present invention.

Figure 1:
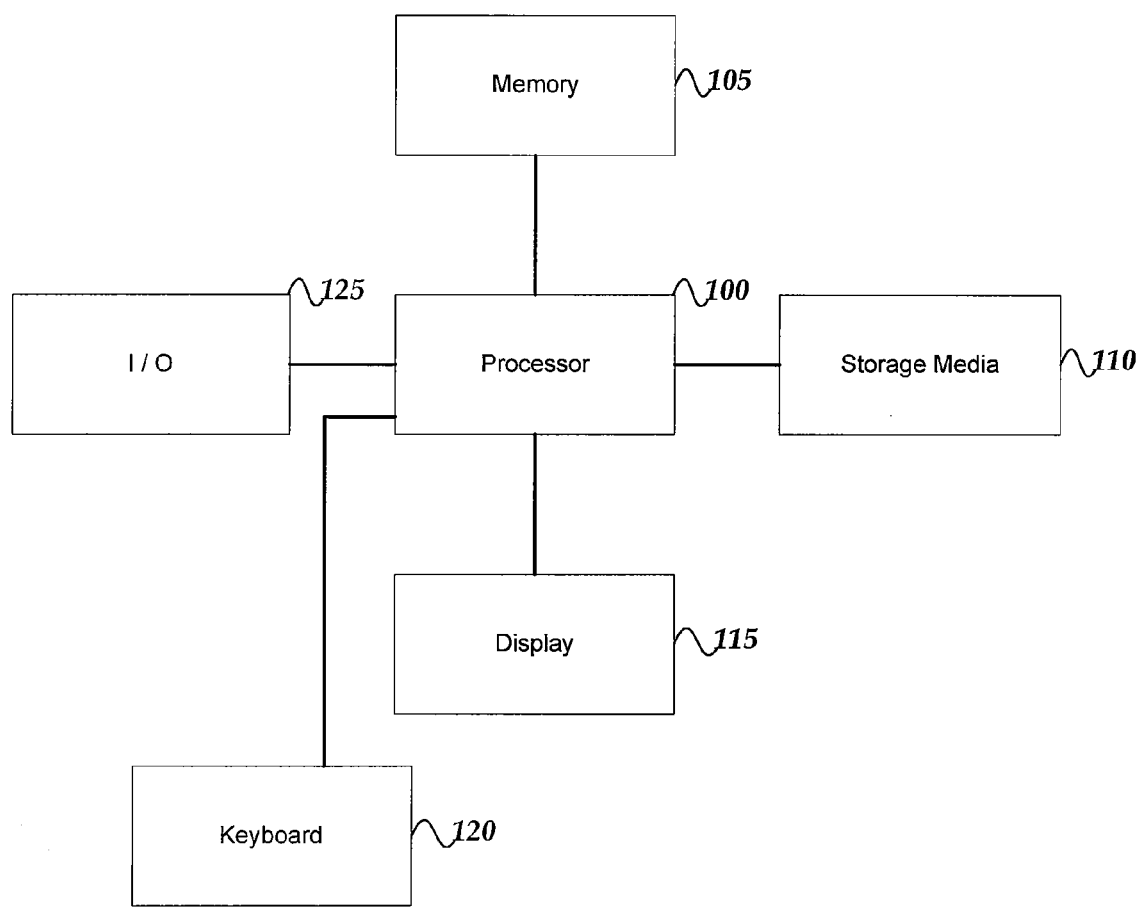
FIG. 1 shows a block diagram of one embodiment of a computer server of the present invention.

FIG. 1 illustrates a block diagram of one embodiment of a computer server of the present invention. The computer server is comprised of a processor (100) that controls the operation of the computer server. An example of such a processor is a POWERPC or PENTIUM processor. The origin server is conceptually a single server. In fact, it may be physically comprised of different processes (i.e., web server, application server, database server).

Memory (105) is coupled to the processor (100). The memory (105) is used by the processor to store data for display (e.g., video RAM), data that are being operated on by the processor (100), and processes to be executed. This memory (105) can include semiconductor memory such as random access memory (RAM), read only memory (ROM), or FLASH RAM. The memory (105) may also include other types of memory beyond semiconductor memory.

Storage media (110) is used by the processor (100) to store data for longer-term storage than that provided by the memory (105). Examples of storage media (110) can include floppy disk drives, optical disk drives, hard drives, or any other type of storage media. The storage media (110) can be removable or fixed in the computer.

The processor (100) uses a display (115) or monitor to display information to the computer user. The display (115) may be a liquid crystal display (LCD), a cathode ray tube (CRT), or any other type of display.

The computer user can use a keyboard (120) to enter data to be used by the processor (100) in generating desired information. In one embodiment, the keyboard (120) is a standard QWERTY-style keyboard with a mouse or trackball.

The computer server also uses input/output (I/O) ports (125) in order to communicate data outside of the computer. These I/O ports (125) can include Universal Serial Bus (USB) ports, IEEE 1394 (FIREWIRE) ports, parallel ports, serial ports, or any other type of I/O output.

The computer server of FIG. 1 is for illustration purposes only. The present invention is not limited to any one type of computer server. Any computer server capable of running the instructions required to accomplish the various embodiments of the present invention is encompassed by the present invention.

Figure 2:
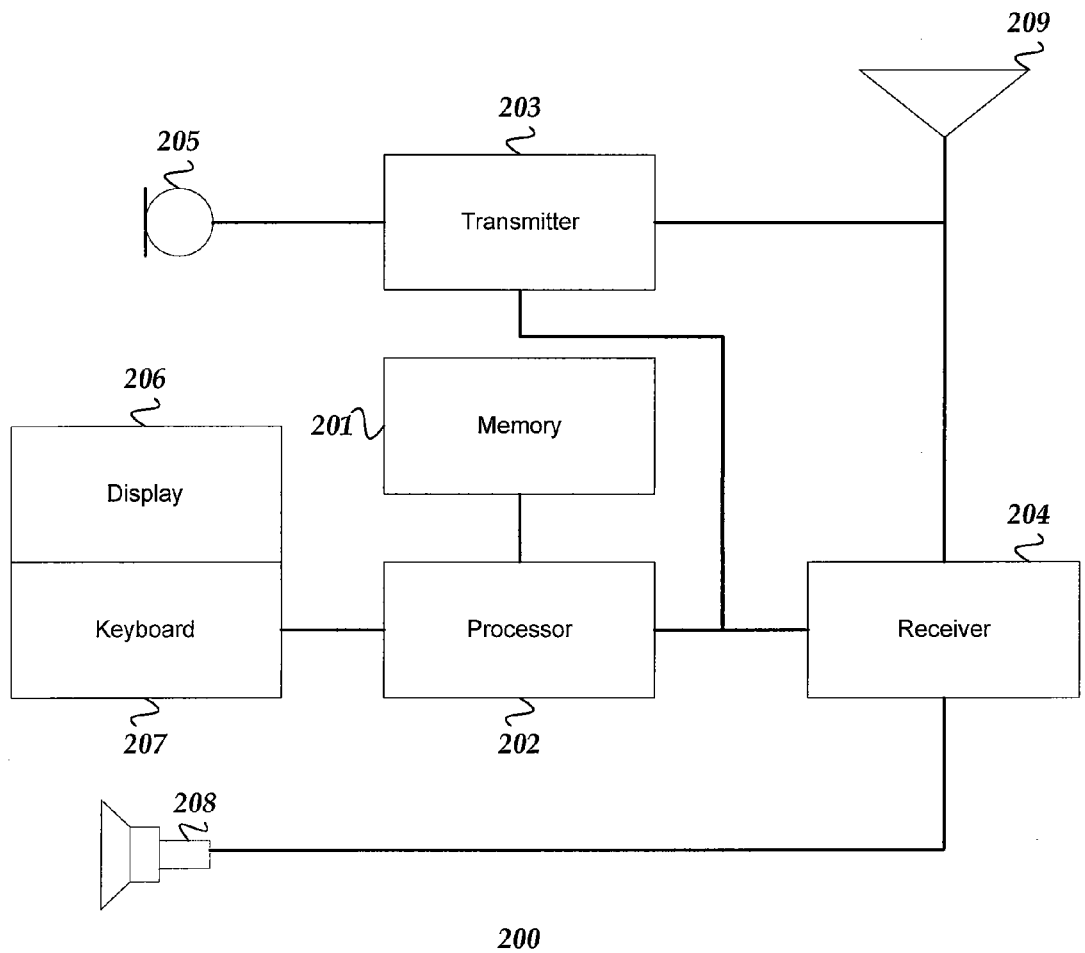
FIG. 2 shows a block diagram of one embodiment of a Web access device of the present invention.

FIG. 2 illustrates a block diagram of a typical Web accessing device (200) of the present invention. In this embodiment, the device is a wireless communication device (e.g., mobile radiotelephone) having Internet access capabilities using an access standard such as Wireless Access Protocol (WAP).

The device (200) is comprised of a microphone (205) for converting a voice signal to an electrical signal for transmission by the transmitter (203) and radiated over the antenna (209). Signals received by the antenna (209) are received and demodulated by the receiver (204) before being converted to an aural signal by the speaker (208).

The transmitter (203) and receiver (204) blocks represent the circuitry required for analog-to-digital conversion, digital-to-analog conversion, modulating, demodulating, and any other task required by the air interface standard (e.g., CDMA, TDMA, GSM) for which the wireless device is designed. The present invention is not limited to any one air interface standard.

The device user inputs information and operates the device by the keypad (207). The keypad (207) can be used to input dual-tone multi-frequency (DTMF) responses. The display (206) shows the user what was input on the keypad (207) as well as information that was received by the receiver (204), such as Web content.

A processor (202) that is coupled to the memory (101) controls the wireless device (200). The processor scans the keypad (207) for inputs, displays appropriate data on the display (206), and controls the transmission and reception of data.

The processor (202) is also responsible for performing any processes used by the device. In the preferred embodiment, the processor runs a Web browser-type process, referred to as the user agent, that communicates data over the Internet. The Web user agent is responsible for interacting with the World Wide Web and Internet such as sending and retrieving e-mails, requesting, accessing, and rendering Web content, and sending information to a Web site.

The user agent is a smaller version of the Web browser programs written for personal computers. These include programs such as MICROSOFT INTERNET EXPLORER and NETSCAPE NAVIGATOR. The user agent for the access device is required to be smaller in size in order to fit in the memory of the device. The user agent must also download and render Web content equivalents for a substantially smaller screen on the device than that used in a typical personal computer. The user agent is well known in the art and is not discussed further herein.

While the Web access device of FIG. 2 is described as a wireless device (200), other types of Web access devices also operate effectively with the process of the present invention. Alternate embodiments include personal digital assistants (PDA), desktop computers, laptop computers, web TVs, web tablets, and telephones (wireline or wireless). In one such embodiment, the wireless communication device is WAP-enabled.

Figure 3:
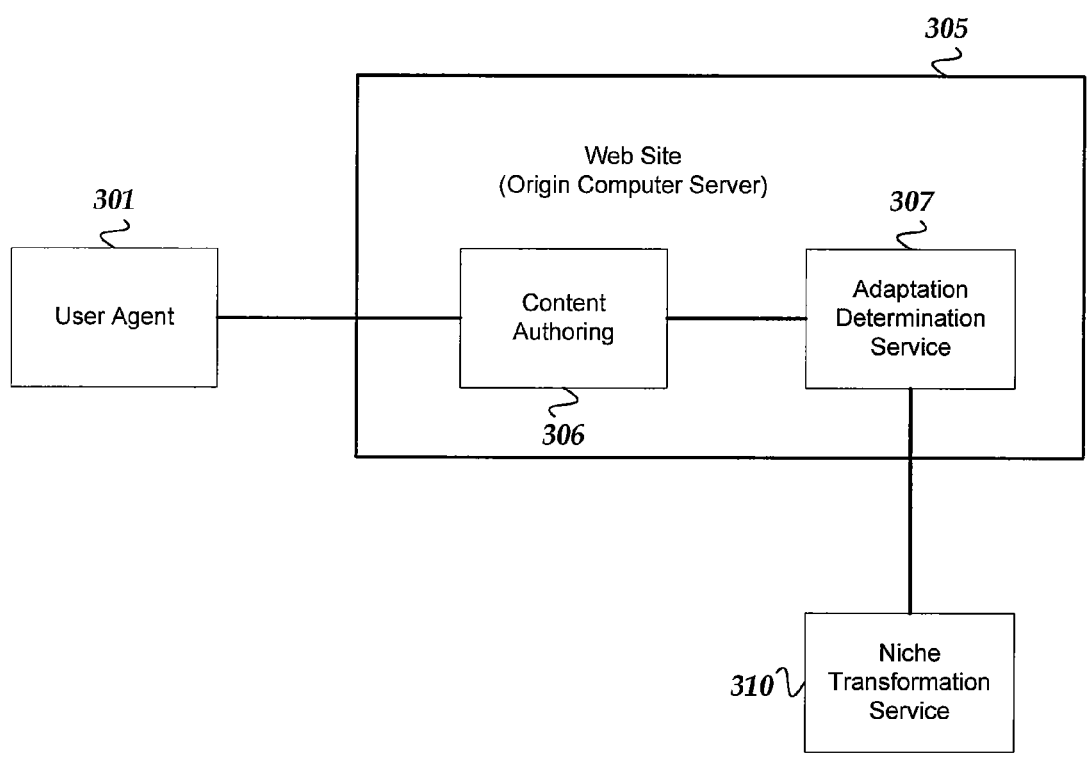
FIG. 3 shows a block diagram of one embodiment of a Web content customization system of the present invention.

FIG. 3 illustrates a block diagram of one embodiment of the Web content customization system of the present invention. The various components of the system communicate using areas Internet communication protocols such as HyperText Transfer Protocol (HTTP), Simple Object Access Protocol (SOAP), extensible Markup Language (XML), and Hypertext Markup Language (HTML). The present invention is not limited to these languages protocols. Alternate embodiments may use other languages and protocols to accomplish substantially similar results.

The above-mentioned Internet communication protocols and languages are well known in the art and are not discussed further in detail. Information regarding these protocols can be found on the Internet. For example, SOAP can be found at http://www.w3.org/TR/soap12-part1.

The Web content of the present invention may be comprised of any data objects retrievable over the Internet. Such data can include Web pages [in part or whole], images, text and any other type of data that can be transmitted over the Internet.

Referring to FIG. 3, the system is comprised of a user agent (301), a Web site (e.g., origin computer server) (305), and a niche transformation service (310). The origin computer server (305) is further comprised of a content authoring application (306) and an adaptation determination service (307).

As described above, the user agent (301) is resident in the Web access device. The user agent (301) is responsible for initiating an HTTP request for Web content to a Web site. The user agent also communicates delivery context information to the Web site.

The delivery context is comprised of information about the physical, network, software capabilities of the Web access device, and any associated execution environment. The physical capabilities may include the size of the Web access device's display, the amount of memory in the device, or the means for inputting data. The network capabilities may include whether the Web access device has Ethernet or wireless capabilities. The software capabilities may include the software language interpreters/compilers that are resident in the device. The associated execution environment may include the whether the device is running JAVA and what operating system (e.g., WINDOWS, MACINTOSH). The delivery context is additionally comprised of user preferences regarding the capabilities of the Web access device. Alternate embodiments have different or additional delivery context definitions.

The origin computer server (305), is responsible for authoring and hosting software applications or Web content that is to be transmitted to and rendered by the user agent. Upon receiving a request for content from the user agent, the content authoring application (306) invokes Web services to determine how the content is to be customized based on characteristics of the content and the delivery context. The content authoring application (306) is also responsible for responding to the user agent's HTTP request with the customized content.

The adaptation determination service (307), resident on the origin computer server (305), interprets the delivery context and maps it to the characteristics of the content. For example, the delivery context may indicate that the access device comprises a 240×240 screen with 4-bit color. The adaptation determination service (307) matches this characteristic up with the images in the content that has been requested by the user agent.

The adaptation determination service (307) uses the results of the mapping operation to determine the type of transformation or transformations that are required. The adaptation determination service (307) then invokes the appropriate Web Service or services that have the ability to perform the specific type of transformations required. For example, if a Web content image is required to be customized to fit the screen of the access device, the adaptation determination service (307) invokes a Web Service that specializes in performing this transformation. The Web Service is also referred to herein as the niche transformation service (310).

When the adaptation determination service (307) transmits the content to be customized to the appropriate niche transformation service (310), suitable portions of the delivery context are also transferred. This gives the transformation service the required information on how to customize the content for rendering on the Web access device.

In one embodiment, the adaptation determination service (307) embeds the Web Services and their location on the Internet in a Web Services Proxy. In another embodiment, the adaptation determination service (307) stores a table of Web Services and their location on the Internet. In this embodiment, the location is a universal resource locator (URL) indicating where each of those specific transformation services can best be performed. In another embodiment, the table contains a back-up URL for each transformation service in case the primary location is down or missing.

While the embodiment described in FIG. 3 includes the content authoring (306) and adaptation determination service (307) on the origin server (305), alternate embodiments may include these processes at other locations. For example, in one embodiment, the content authoring and adaptation determination service are located on different computer servers.

The niche transformation service (310) of FIG. 3 interprets the delivery context transmitted by the adaptation determination service along with the Web object (or resource) that is to be customized. The niche transformation service (310) then carries out the customization required in order to make the content fit the delivery context requirements.

In performing this transformation or customization, the niche transformation service (310) may be required to invoke a child Web Service (i.e., a sub-niche transformation service) in order to adequately perform the transformation. In doing so, the niche transformation service may itself contain a niche adaptation determination service and may also communicate suitable subsets of the delivery context or generic versions thereof to the sub-niche transformation service. The invoked niche transformation service may not have the required ability to perform a specific customization or transformation sub-task. In this case, the niche transformation service can invoke another niche transformation service as the child Web Service in order to perform that sub-task.

For example, the parent niche transformation service may be required to customize the content such that images are reduced to 240×200 and all hyper-links are removed. In this example, the parent service does not have the ability to reduce the images and, therefore, invokes the child niche transformation service to perform this image reduction. After the image reduction, the customized image content is transmitted back to the parent niche transformation service for integration with the remaining content.

For purposes of clarity, the system of FIG. 3 illustrates only a single niche transformation service. Alternate embodiments may include any number of niche transformation services as required by the content to be customized. In other words, there may be one niche transformation service for scaling an image in the Web content while a second niche transformation service may be used to format text.

In one embodiment, the transformed version of the Web content may be cached by the invoker to prevent degradation of performance. In such an embodiment, there may be a pre-configured infrastructure wherein any privacy arrangements are worked out apriori with the user and among all participants on the infrastructure.

Figure 4:
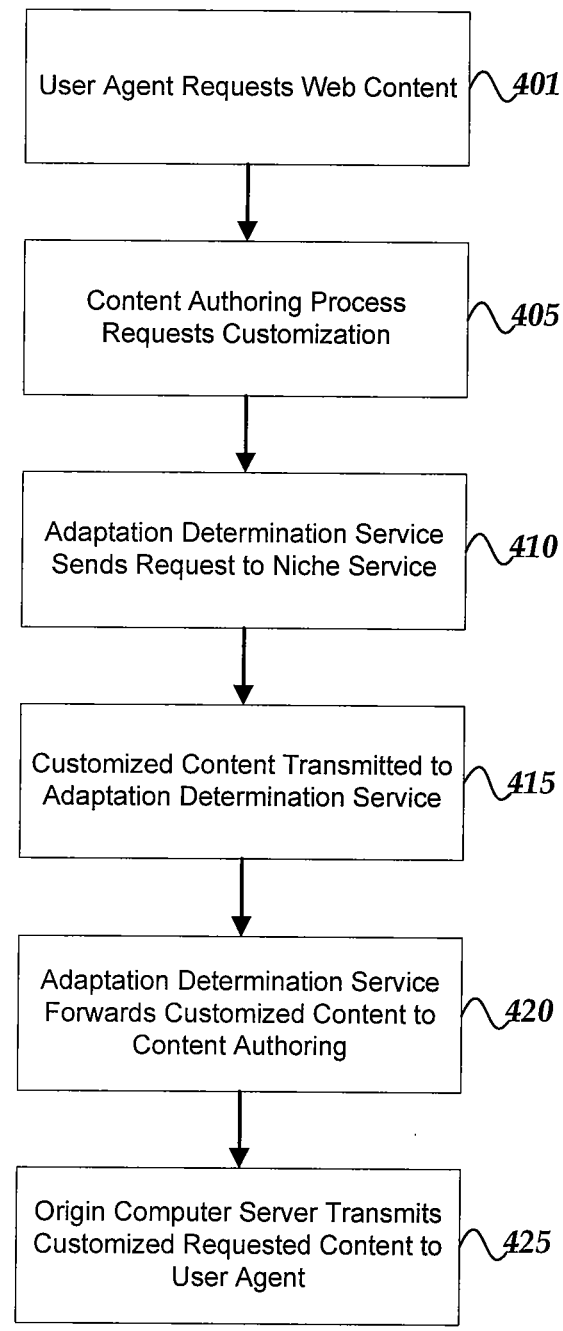
FIG. 4 shows a flowchart of one embodiment of a customization method of the present invention.

FIG. 4 illustrates a flowchart of one embodiment of the customization method of the present invention. The process begins with the user agent requesting Web content from the origin computer server (step 401). In one embodiment, this request is in the form of a GET or POST method over HTTP and includes the delivery context, as defined above. For example, the request may appear as: HTTP GET<delivery context>, where the "delivery context" is replaced by the actual characteristics of the requesting Web access device using HTTP headers or alternate mechanisms. Alternate embodiments use other types of instructions to generate this request.

The content authoring process at the origin server receives the content request. The content authoring process then transmits a request for customization to the adaptation determination service (step 405). In one embodiment, this request is in the form of an XML message over SOAP-compliant protocols such as CUSTOMIZE<delivery context, content>. This provides the adaptation determination service with both the delivery context information from the user agent and the content to be customized along with the instruction to customize. Alternate embodiments use other types of instructions to generate this request.

The content may be passed to the adaptation determination service in many different methods. One embodiment passes the actual content to the adaptation determination service. Another embodiment transmits a location of the content where the location may be a URL or some other network address or locator. The present invention is not limited to transmitting the actual content among any of the blocks of the customization system.

The adaptation determination service transmits a request to the niche transformation service to customize the content (step 410). In one embodiment, this request is in the form of an XML message over SOAP-compliant protocols such as: TRANSFORMREQUEST<delivery_context', contentObj'>. Alternate embodiments use other types of instructions to generate this request.

Included in the request from the adaptation determination service are the elements delivery_context' and contentObj'. The delivery_context' element is a subset of attributes of the set of delivery context information from the user agent. The adaptation determination service makes a determination regarding which subset of attributes to convey to the niche transformation service. Since there may be a plurality of niche transformation services by the adaptation determination service, each niche transformation service may get a different delivery_context' element.

Web content is typically comprised of multiple resources or objects that are referred to as contentObj. One of these resources or objects is the contentObj element of the TRANSFORMREQUEST instruction. The contentObj' element is to be transformed into another form based on the delivery_context' attributes. This transformed or customized content is subsequently referred to as TxContentObj.

The process of FIG. 4 continues with the customized content (e.g., TxContentObj) from the niche transformation service or services being transmitted back to the adaptation determination service (step 415) using SOAP-compliant protocols. The adaptation determination service forwards the customized content to the content authoring block (step 420) using SOAP-compliant protocols. The customized content is subsequently referred to as AdaptedContent.

The response agent's request is transmitted to the user agent from the origin computer server (step 425). The format of this response, in one embodiment, over HTTP with a response command. For example, this response may take the form of: response<AdaptedContent>.

The Web content customization system and methods of the present invention provides greater privacy protection of the user's data communication prior art methods. This is accomplished by maintaining users personally identifiable information (e.g., email address or IP address) only at the origin Web computer server. No personal identifiable information is shared with the adaptation services or Web Service providers. Thus, personally identifiable information shared by the user by means of either a transaction (e.g., online banking or e-commerce) or resulting from communication of delivery context information is not communicated with a third party Web Service.

Additionally, any personally identifiable information that is necessary to be shared with third parties is disclosed in the origin computer server's privacy policy. Thus the user is fully aware of what data is being shared with whom and for what purpose. At this point, the user is empowered to opt-out of any interaction with the origin computer server.

The Web content customization methods of the present invention encompasses many different types of transformation. The following types of transformation are for illustration purposes only and do not limit the present invention in any way.

In one embodiment, a parameterized template (e.g., content, contentObj') that contains no user specific information is sent to the niche transformation service. This template is adapted by the niche transformation service based on delivery context information sent by the origin computer server. The transformed template (e.g., TxContentObj, AdaptedContent') is returned to the origin computer server. The server then populations the appropriate user specific information to generate the final response to the user agent.

In another embodiment, the user specific information is sent along with the template and the final transformation (e.g., AdaptedContent) is obtained by the origin computer server. The AdaptedContent is then passed along to the user agent.

In yet another embodiment, contentObj' may take the form of a MIME type that is transformed into another MIME type by the niche transformation service. For example, the niche transformation service may perform an HTML to Wireless Mark-up Language (WML) conversion or a "gif" to "jpeg" conversion of an image.

In still another embodiment, the contentObj' and TxContentObj can both be of the same MIME type. The niche transformation service transforms one form of MIME to another form of the same MIME type. For example, a color "gif" image may be transformed into a black and white "gif" image.

In summary, the Web content customization system and methods of the present invention provide an architecture wherein the content adaptation function in the adaptatin determination function are implemented as Web Services that are invoked by a web application server. One or more specialized Web Services, also known as niche transformation services, can be used to customize requested Web content to fit a particular Web access device area. These services are provided while maintaining a user's personally identifiable information as private.

Numerous modifications and variations of the present invention are possible in light of the above teachings. It is therefore to be understood that within the scope of the appended claims, the invention may be practiced otherwise than as specifically described herein.

What is claimed is:

1. A method comprising:
    accessing, by executing an instruction with a processor of a first web server, a first request for web content, the web content residing on the first web server, the first request originating from a client device, the first request including delivery context information, the delivery context information including a size of a display of the client device;
    generating, by executing an instruction with the processor of the first web server, a second request to transform the web content into modified web content based on a customization requirement associated with the delivery context information;
    obtaining, by executing an instruction with the processor of the first web server, the modified web content from a second server in response to the first web server transmitting the second request to the second server; and
    transmitting the modified web content, from the first web server to the client device.

2. The method of claim 1, further including sending the second request to the second server, the second server being separate from the first web server.

3. The method of claim 1, wherein the transmitting of the second request to the second server includes sending a universal resource locator of the web content to the second server.

4. The method of claim 1, wherein the modified web content includes cached modified web content.

5. The method of claim 1, wherein the client device includes a cellular telephone.

6. The method of claim 1, wherein the customization requirement provides information on how to customize the web content for the client device, and the accessing of the first request includes receiving the first request via a wireless link.

7. The method of claim 1, wherein the transmitting of the second request to the second server is to invoke a web service implemented by the second server.

8. A first web server comprising:
    a processor; and
    memory including machine readable instructions that, when executed by the processor, cause the processor to perform operations including:
        accessing a first request for web content, the web content residing on the first web server, the first request originating from a client device, the first request including delivery context information, the delivery context information including a size of a display of the client device;
        generating a second request to transform the web content into modified web content based on a customization requirement associated with the delivery context information;
        receiving the modified web content from a second server in response to transmitting the second request to the second server, the second server being separate from the first web server; and
        transmitting the modified web content to the client device.

9. The first web server of claim 8, wherein the operations further include sending the second request to the second server.

10. The first web server of claim 8, wherein the transmitting of the second request to the second server includes sending a universal resource locator of the web content to the second server.

11. The first web server of claim 8, wherein the transmitting of the second request to the second server is to invoke a service to transform the web content residing on the second server.

12. The first web server of claim 8, wherein the client device includes a cellular telephone.

13. The first web server of claim 8, wherein the customization requirement provides information on how to customize the web content for the client device, and further including receiving the first request via a wireless link.

14. The first web server of claim 8, wherein the modified web content includes cached modified web content.

15. A tangible computer readable storage device including instructions which, when executed, cause a first web server to perform operations comprising:
- accessing a first request for web content, the web content residing on the first web server, the first request originating from a client device, the first request including delivery context information, the delivery context information including a size of a display of the client device;
- generating a second request to transform the web content into modified web content based on a customization requirement associated with the delivery context information;
- accessing the modified web content received from a second server in response to transmitting the second request to the second server; and
- transmitting the modified web content to the client device.

16. The tangible computer readable storage device of claim 15, wherein the operations further include sending the second request to the second server, the second server being separate from the first web server.

17. The tangible computer readable storage device of claim 15, wherein the transmitting of the second request to the second server includes sending a universal resource locator of the web content to the second server.

18. The tangible computer readable storage device of claim 15, wherein the modified web content includes cached modified web content.

19. The tangible computer readable storage device of claim 15, wherein the customization requirement provides information on how to customize the web content for the client device, and the first request is received via a wireless link.

20. The tangible computer readable storage device of claim 15, wherein the client device includes a cellular telephone.

\* \* \* \* \*